United States Patent [19]

Poirier et al.

[11] 4,149,095

[45] Apr. 10, 1979

[54] MONOLITHIC STRUCTURE FOR STORING ELECTRICAL CHARGES

[75] Inventors: Raymond Poirier; Nicolas Szydlo, both of Paris, France

[73] Assignee: Thomson-CSF, Paris, France

[21] Appl. No.: 675,192

[22] Filed: Apr. 8, 1976

[30] Foreign Application Priority Data

Apr. 11, 1975 [FR] France .................................. 75 11310

[51] Int. Cl.$^2$ .............................................. H01G 7/02
[52] U.S. Cl. ............................................... 307/400 ET
[58] Field of Search ................ 307/88 ET; 179/111 E; 340/173 R; 365/185; 361/322; 357/23, 55

[56] References Cited

U.S. PATENT DOCUMENTS

| 3,257,592 | 6/1966 | Maissel ................................. 361/322 |
| 3,354,373 | 11/1967 | Fatovic ............................. 307/88 ET |
| 3,797,000 | 3/1974 | Augusta et al. .................. 340/173 R |
| 3,946,422 | 3/1976 | Yagi et al. ........................ 307/88 ET |

*Primary Examiner*—James W. Moffitt
*Attorney, Agent, or Firm*—Oblon, Fisher, Spivak, McClelland & Maier

[57] ABSTRACT

An electret consisting of a conductive electrode embedded in insulating materials, is provided. In comparison with conventional electrets comprising a dielectric storage member, this electret exhibits a much higher capacity. Moreover it can be manufactured together with an integrated circuit incorporating the structure according to the invention, onto its substrate. For charging the electret an electrolytic process is utilized, if necessary through an opening perforated in the upper insulating layer. In the latter case the metal constituting the electrode can be advantageously be oxidized by anodic oxidation. The lifetime is improved by the oxide layer.

9 Claims, 4 Drawing Figures

MONOLITHIC STRUCTURE FOR STORING ELECTRICAL CHARGES

BACKGROUND OF THE INVENTION

This invention relates to charge storage structures of the kind known as "electrets," a neologism which designates an insulating material containing permanently stored electrical charges (retention time of the order of several years).

Electrets are generally made in the form of a thin membrane (a few tens of microns) of a synthetic organic polymer, such as polypropylene, polychlorofluorethylene, polyvinyl carbazole, etc. A flexible membrane such as this arranged between two electrodes has often been used for forming, by virtue of the electrical field developed by the stored charges, a transducer which converts the acoustic vibrations of the ambient air into electrical vibrations (microphone) and electrical vibrations into acoustic vibrations (receiver).

The quantity of charges in an insulating material is limited by the nature of the dielectric constituting the membrane. Accordingly, the electrical field is often far from that which the dielectric used for forming the electret could tolerate without disruption. In the case of a microphone, a preamplifier is generally necessary in spite of the gain of the electret transducer in relation to the conventional capacitor microphone.

The invention enables all or some of the above limitations to be overcome.

SUMMARY OF THE INVENTION

According to the invention, there is provided a monolithic structure for storing electrical charges, comprising substrate and a conductive electrode embedded in insulating materials, said substrate supporting a first layer consisting of an insulating material covering a first surface of said substrate, said first layer supporting a second layer consisting of a conductive material covering a second surface smaller than said first surface and a third layer consisting of insulating material covering the assembly constituted by said substrate, said first and second layers.

BRIEF DESCRIPTION OF THE DRAWINGS

The invention is described in more detail in the following with reference to the accompanying drawings, wherein.

DESCRIPTION OF THE PREFERRED EMBODIMENTS

Figure 1:
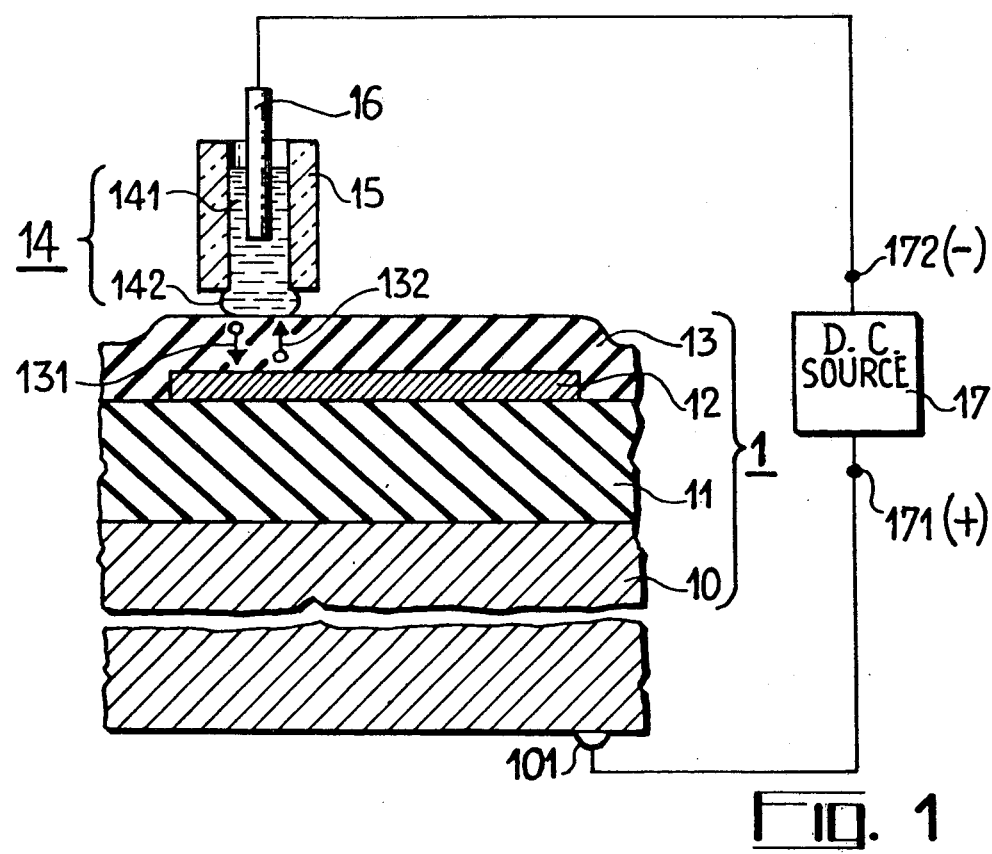
FIG. 1 is a diagrammatic section through one embodiment of the structure according to the invention illustrating the charging principle.

The structure 1 shown in FIG. 1 is a particular embodiment of the invention because it is formed on a silicon wafer 10 by the deposition of successive, alternately (electrically) insulating and conductive layers. A structure such as this may readily be obtained during the production of an integrated circuit using the silicon wafer 10 of which only part is shown in FIG. 1. This example is by no means limiting and the electret may be formed by an electrode embedded in an insulating mineral, the assembly being placed on an electrically conductive support to enable it to be charged.

In the example shown in FIG. 1, an organic or inorganic insulating layer 11 of the order of 10 to 100 microns thick is deposited onto the silicon wafer 10 which may vary from one to several hundred microns in thickness. This is followed by the deposition of a 2 to 3 microns thick layer of silicon 12 by a known process of decomposing a silane in the vapor phase and in a chlorine-containing atmosphere. This layer is treated by photogravure so as to make its surface smaller than that of the layer 11. The silicon may then be coated by the deposition of an additional insulating layer. A layer 13 of silica, obtained in the same way as the layer 12, but in an oxidizing atmosphere, is deposited onto the preceding layers. It is for example a few microns thick.

Electrical charges are stored in the structure by using an electrolytic liquid 14, for example glycol containing a small quantity of potassium nitrate, which is brought into contact with the surface of the layer 13. The liquid 14 forms a column of electrolyte 141 which is supported by the inner passage of a capillary tube 15 in contact with a droplet 142 on the surface of the layer 13.

Electrolysis is obtained by means of a direct current source 17 with a positive terminal (171) and a negative terminal (172). A d.c. voltage varying from one to several hundred volts is supplied between the two terminals, the positive terminal being connected to the wafer 10 by an ohmic contact 101, and the negative terminal being connected to an electrode 16 dipping into the liquid 141.

It is thus possible to charge the capacitor formed by the electrode 12 and the wafer 10. The charging current which flows through the layer 13 is attributable to the formation of negative ions 131 emanating either from the electrolyte or from the mineral insulating material, and positive ions 132 emanating from the electrode 12. The charge obtained is maintained when the tube 15 is withdrawn.

Figure 2:
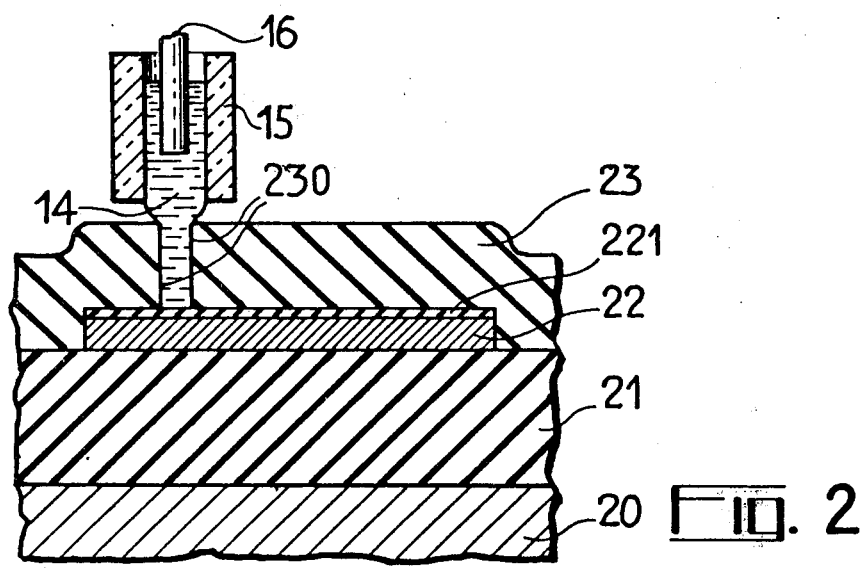
FIG. 2 illustrates the charging according to the invention of a structure comprising an embedded electrode coated with a thin layer of oxide.

In the structure shown in FIG. 2, which comprises insulating layers 21 and 23 covering a conductive layer 22 on a semiconductor substrate 20, the layer 22 is covered over one of its major surfaces by a layer 221 of oxide obtained by anodic oxidation immediately after depositing this conductive layer. The metal in question is, for example, aluminium or tantalum of which the oxide, obtained in this way, is a dielectric with the property of transporting charges.

Anodic oxidation is obtained by dipping the substrate into a bath of electrolyte, the layer 22 forming the anode during the electrolysis operation.

A hole 230, formed by selective chemical attack, is provided in the insulating layer 23 covering the layer 22. For example, a mixture of hydrofluoric acid and ammonium fluoride, which is an agent for selectively attacking silica in the presence of aluminium or tantalum oxide, is used for a layer 22 of aluminium or tantalum and an insulating layer 23 of silica.

In the example of FIG. 2, the substrate 20 may be a silicon wafer, in which case the layers 21 and 23 may consist of silica.

The apparatus diagrammatically illustrated in FIG. 1 is used for charging the structure shown in FIG. 2. However, the end of the capillary tube 15 is applied to a hole 230 so that the electrolyte 14 penetrates through to the layer 221. The charges are stored in the same way as explained in the preceding case, except that charge transport takes place through the single oxide layer which accelerates the charge.

After a period of time determined by trial and error, the tube 15 is withdrawn, thereby disrupting the column of electrolyte and the insulation of the structure. The hole 230 may be blocked with a droplet of molten glass or organic polymer.

Figure 3:
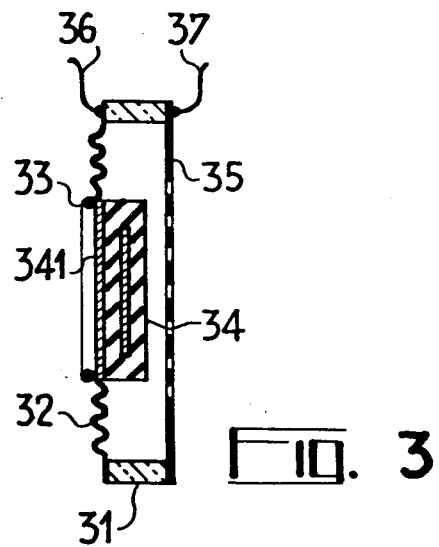
FIGS. 3 and 4 diagrammatically illustrate electronic components using a structure according to the invention.

FIG. 3 is a diagrammatic section through a transducer comprising a structure according to the invention. On either side of a circular mounting 31 of insulating material there is fixed a metallic membrane 32 in the form of an annular disc of wave-form cross-section, which provides it with a certain degree of flexibility, and on the other side a rigid disc 35 formed with holes. An electret 34 according to the invention, in the form of a disc of which the external diameter is of the same order as the internal diameter of the membrane 32, is fixed to the center of the membrane 32 by a weld ring 33. The electret 34 is provided on one of its surfaces with a metal coating 341 to which the ring 33 is welded. Two connections 36 and 37 are welded to the membrane 32 and disc 35, respectively, enabling the component to be fed with electricity. A transducer of this type may be used either as a microphone or as a receiver. In the case of a microphone, the acoustic waves entering through the holes in the disc 35 induce transverse vibrations in the elastically suspended (membrane 32) rigid electret, and the corresponding charge displacements produce variations in the feed current. In the case of a receiver, it is conversely the variations in current which cause displacements of the disc, generating acoustic vibrations.

Figure 4:
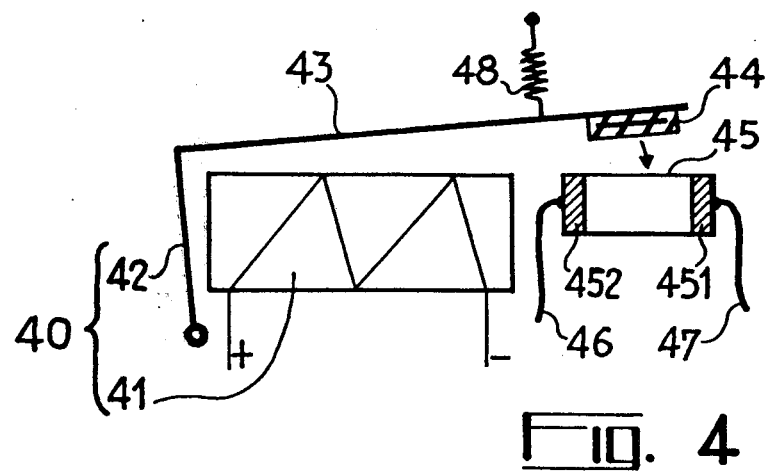

Another example of the application of the structure according to the invention, which is shown in FIG. 4, concerns contactless relays. A relay 40 is symbolically represented by a coil 41 and a moving armature 42 which closes a magnetic circuit (not shown). The armature 42 carries an arm 43 bent at right-angles which at its end supports an electret 44, for example rectangular in shape. A field effect transistor 45, of the enhancement type without a gate electrode, comprises a parallelepiped of semiconductor material and resistive contacts 451 and 452 at the ends of the parallelepiped. The transistor is arranged in such a way that the electret is applied to a major surface of the parallelepiped when the armature 42 is attracted. Under the action of the charges contained in the electrode, a conduction channel can be induced in the semiconductor material providing the sign of these charges is suitable (charges + for a P doped material). A conductive path is established between the connections 46 and 47 connected to the drain and source resistive contacts.

A return spring 48 keeps the electret away when the armature of the relay is inoperative.

Two major advantages of the invention are the following:

capacity of storing an electrical charge 5 to 10 times bigger than in the case of known structures, for instance 500 nanocoulombs per $cm^2$ instead of 100 nanocoulombs per $cm^2$ ability to combine the structure with other components in a monolithic integrated circuit.

A supplementary advantage due to the oxide layer covering the electrode is a longer lifetime.

Obviously, numerous modifications and variations of the present invention are possible in light of the above teachings. It is therefore to be understood that within the scope of the appended claims, the invention may be practiced otherwise than as specifically described.

What is claimed as new and desired to be secured by Letters Patent of the United States is:

1. In a semiconductor device having a semiconductor substrate and a group of discrete components and integrated circuits, the improvement consisting of an electret integrated in said device, comprising:
    a first layer laid down on said semiconductor substrate of said device and made of a dielectric incapable of transporting ions;
    a second layer contiguous to said first layer and made of electret material capable of storing 500 nanocoulombs per $cm^2$ of electronic charge; and
    at least a third layer contiguous to said second layer and made of a dielectric capable of transporting ions.

2. The improvement recited in claim 1, wherein:
said electret material is silicon, and
said third layer is made of silicon oxide.

3. The improvement recited in claim 1 wherein:
said electret material is a metal, and
said third layer is made of silicon oxide.

4. The improvement recited in claim 3 wherein:
said metal is aluminum.

5. The improvement recited in claim 3 wherein:
said metal is tantalum.

6. In a semiconductor device having a semiconductor substrate, the improvement consisting of an electret integrated in said device, comprising:
    a first layer laid down on said semiconductor substrate of said device and made of a dielectric incapable of transporting ions;
    a second layer contiguous to said first layer and made of an electret metal capable of storing 500 nanocoulombs per $cm^2$ of electronic charge;
    a third layer contiguous to said second layer and made of an oxide of said metal; and
    a fourth layer contiguous to said third layer and made of a dielectric.

7. The improvement recited in claim 6, wherein:
said fourth layer is made of silicon oxide.

8. The improvement recited in claim 7, wherein:
said metal is aluminum.

9. The improvement recited in claim 7 wherein:
said metal is tantalum.

* * * * *